March 20, 1951 — C. T. HOLMAN — 2,545,734
GARDNER'S TOOL
Filed Aug. 25, 1947
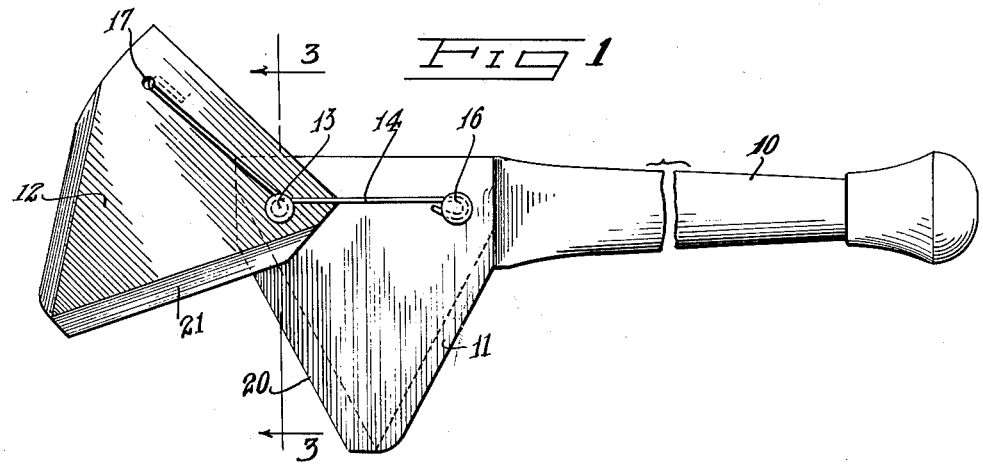
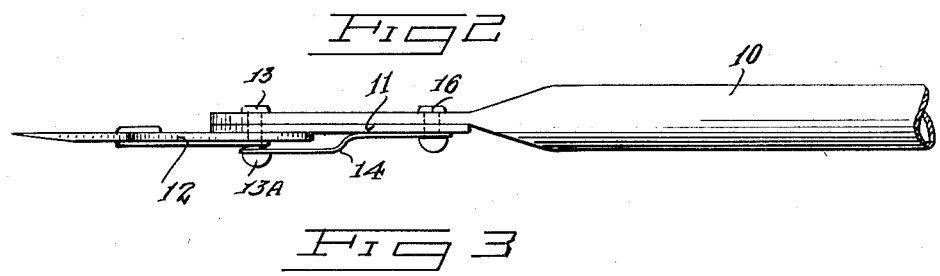
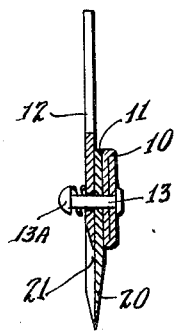
Inventor
Clarence T. Holman
By Lyon & Lyon
Attorneys Patented Mar. 20, 1951

2,545,734

UNITED STATES PATENT OFFICE 2,545,734

GARDENER'S TOOL

Clarence T. Holman, Glendale, Calif.

Application August 25, 1947, Serial No. 770,387

2 Claims. (Cl. 30—253)

The present invention relates to an improved gardener's tool.

An object of the present invention is to provide an improved gardener's tool especially useful in trimming hedges, bushes, trees and the like.

Another object of the present invention is to provide an improved gardener's tool characterized by its simplicity and ease of manufacture in accordance with present day mass production methods.

Still another object of the present invention is to provide an improved gardener's tool incorporating a cutting element which is moved into cooperating position in a new and improved manner.

Yet another object of the present invention is to provide an improved cutting tool comprising two blades in which relative movement of the blades is produced by the application of inertia forces to one of the blades.

Still another object of the present invention is to provide an improved tool useful in trimming hedges, bushes, trees and the like which may be fabricated from parts which are conveniently available on the present day market.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a view in side elevation of a gardener's tool embodying the present invention.

Figure 2 is a view in top elevation of the same.

Figure 3 is a sectional view taken substantially on the line 3—3 of Figure 1.

The tool shown in the figures comprises a handle member 10 having stationarily mounted thereon a first cutting blade 11 which in turn has pivotally mounted thereon a second spring biased cutting blade 12, blade 12 being pivotally mounted on the pin 13 and normally maintained in the position shown in Figure 1 by the torque spring 14. Torque spring 14 has one of its ends affixed to the pin 16 fastened to the blade element 11 and the other one of its ends anchored in aperture 17 in blade 12 after being coiled around the pivot pin 13 in prestressed condition.

The cutting edges 20 and 21 on members 11 and 12 respectively are the cutting edges of the instrument and are arranged for cooperation in the same manner as are the conventional scissors or shears, the cutting edges 20, 21 being spring biased together by the transverse forces exerted by the coiled portion of the torque spring 14. In other words, the coiled portion of torque spring 14 exerts a resilient force between the head 13A of pin 13 and the cutting element 11 to resiliently press the cutting edges 20, 21 into sliding engagement. Thus, the torque spring 14 serves two functions—namely, to normally maintain the cutting element 12 in the position shown in Figure 1 and to bias the cutting edges 20, 21 together.

The handle member 10 may be secured in many different manners to the cutting element 11 and may, for example, be fastened thereto by the same pins 13, 16 described above.

In operation of the tool shown in Figure 1, the cutting edge 21 is moved into cutting relationship with the cooperating cutting edge 20 upon the application of inertia forces to the member 12, which inertia forces are sufficient to overcome the forces exerted on the element 12 by the torque spring 14. Such inertia forces may be applied by grasping the handle member 10 and "snapping" it very much like one snaps an elongated whip. In other words, if it is desired to cut twigs from trees or to trim hedges, the cutting elements 11 and 12 are swung in an arc to a position wherein the undesired portions of the trees or hedges are disposed between the cutting edges 20, 21 after which the motion of the handle 10, blade 11, and pivot pin 13 is abruptly stopped in which case the inertia forces acting on blade 12 cause it to move further against the action of torque spring 14 to produce relative movement between the cutting edges 20, 21 to thereby shear such undesired portions of the tree or hedges disposed therebetween. While the description of the action of the tool appears rather involved, the tool may be used by simply grasping the handle 10 and using a wrist action, which is easily developed.

While the particular embodiment of the present invention has been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a cutting tool of the character described, a handle member, a first cutting element mounted on said handle member, a second cutting element pivotally mounted on said first cutting element and movable in response to inertia forces thereon, to form a pair of cutting shears therewith, a torque spring having one of its ends mounted stationarily with respect to the first cutting element and the other one of its ends stationarily mounted with respect to the other cutting element, said torque spring having a coil portion arranged to press said cutting elements in sliding engagement, said second cutting element being moved to shear closing position against the action of said torque spring upon the application of inertia forces to said second cutting element.

2. In a tool of the character described, a first cutting element, a handle member affixed to said cutting element, a second cutting element pivotally and slidably mounted on said first cutting element and movable in response to inertia forces thereon to form a pair of shears, a pin pivotally connecting said first cutting element and said second cutting element, a torque spring having one of its ends anchored on the first cutting element and the other one of its ends stationarily mounted on the second cutting element, said torque spring being wound around said pin to press said first and second cutting elements in sliding engagement, said second cutting element being movable to shear closing position against the action of said torque spring upon grasping said tool by said handle in the same manner as a whip.

CLARENCE T. HOLMAN.

REFERENCES CITED

The following references are of record in the file of this patent:

UNITED STATES PATENTS

| Number | Name | Date |
|---|---|---|
| 88,895 | Murdock | Apr. 13, 1869 |
| 235,416 | Davies | Dec. 14, 1880 |
| 874,516 | Low | Dec. 24, 1907 |
| 1,007,836 | Allison | Nov. 7, 1911 |
| 1,186,235 | Schrade | June 6, 1916 |